United States Patent

Haeffner

[11] Patent Number: 5,804,071
[45] Date of Patent: Sep. 8, 1998

[54] ROTATING DISC FILTER MEANS

[75] Inventor: Roger Haeffner, Älta, Sweden

[73] Assignee: Nordic Water Products AB, Sweden

[21] Appl. No.: 716,222
[22] PCT Filed: Mar. 23, 1995
[86] PCT No.: PCT/SE95/00306
 § 371 Date: Sep. 20, 1996
 § 102(e) Date: Sep. 20, 1996
[87] PCT Pub. No.: WO95/25578
 PCT Pub. Date: Sep. 28, 1995

[30] Foreign Application Priority Data

Mar. 24, 1994 [SE] Sweden ................................. 9400993
Mar. 24, 1994 [SE] Sweden ................................. 9400994

[51] Int. Cl.⁶ ..................................................... B01D 33/23
[52] U.S. Cl. .......................... 210/393; 210/394; 210/331; 210/332; 210/333.01; 210/334
[58] Field of Search .................................. 210/331, 332, 210/333.01, 334, 393, 394, 403

[56] References Cited

U.S. PATENT DOCUMENTS 1,712,258  5/1929  Compain .
2,765,915  10/1956  Nilsson .
2,891,671  6/1959  Nilsson .
3,163,601  12/1964  Ericson .
3,278,039  10/1966  Nilsson .
4,724,077  2/1988  Uchiyama .
5,667,680  9/1997  Haeffner .

FOREIGN PATENT DOCUMENTS

95/01825  1/1995  WIPO .

Primary Examiner—Thomas M. Lithgow
Attorney, Agent, or Firm—Limbach & Limbach L.L.P.

[57] ABSTRACT

A rotating disc filter for separating coarse phase from a liquid mixture having carrier elements and blocking means that prevent the coarse phase from falling back into the pool of incoming liquid mixture. The capacity of the filter is increased by the prevention of the coarse phase from being filtered again and thereby occupying filter area.

7 Claims, 3 Drawing Sheets

ROTATING DISC FILTER MEANS

BACKGROUND OF THE INVENTION

The present invention relates to a rotating filter having a number of filter discs being arranged on a rotor. More precisely, the filter is so designed that the liquid mixture to be filtered is supplied through a hollow shaft of the rotor to the inside of the filter discs, each filter disc being comprised of two side walls with filter means and a wall provided around the periphery, preferably also provided with filtering means.

At the filtration the liquid passes through the filtering means outwards from the inside, whereby a filter layer comprised of solid particles, a coarse phase, is formed on the inside of the filtering means. The filtration takes place with the aid of a hydrostatic overpressure, which is obtained because the liquid level of the liquid mixture inside the rotor is arranged higher than the liquid level of the filtrate outside the filter discs. A disc filter of this type is disclosed in e.g. the U.S. Pat. No. 3,163,601.

The problems of filters having a flow direction from the inside to the outside through the filtering means are that a large part of the filter layer, when this has reached above the pool surface of not filtered liquid mixture, during the rotation falls off and back into the pool. This creates a higher concentration in the liquid mixture coming in and thereby the technical performance of the filter is deteriorated, i.e. its capacity in different aspects, such as the hydraulic capacity, the amount of separated solid particles and/or the purity of the filtrate.

SUMMARY OF THE INVENTION

The object of the present invention is to increase the capacity of the filter. This results in that, at a given incoming flow a smaller filter area and thereby smaller filter units are required.

According to the present invention, in the inside space of the filter discs, carrier elements for the filtered coarse phase as well as blocking means for preventing this coarse phase to fall back down into the pool of the incoming liquid mixture, are provided. These blocking means will in the following be called barrier elements. By preventing coarse phase from being filtered once more and thereby occupying filter area the capacity of the filter is increased.

A filter according to the present invention is well adapted for purification of sewage water, raw water, so called backwater in the paper industry and for fibre recovery in the paper industry.

BRIEF DESCRIPTION OF THE DRAWINGS

The invention, having the characteristics according to the appended claims, will be described more in detail in the following with reference to the appended drawings, in which

DETAILED DESCRIPTION OF A PREFERRED EMBODIMENT

Figure 1:
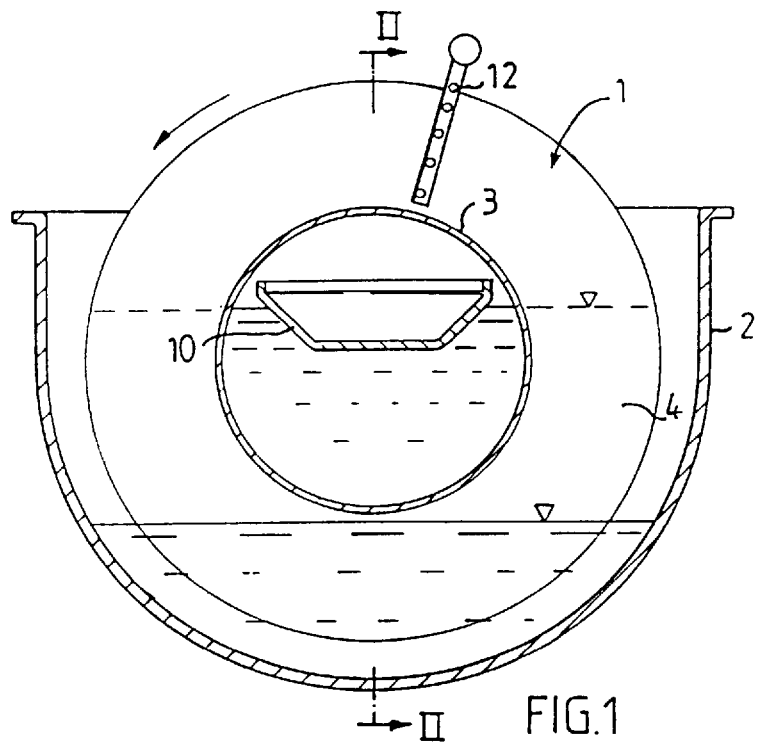
FIG. 1 shows a cross section (I—I in FIG. 2) of a filter.
Figure 2:
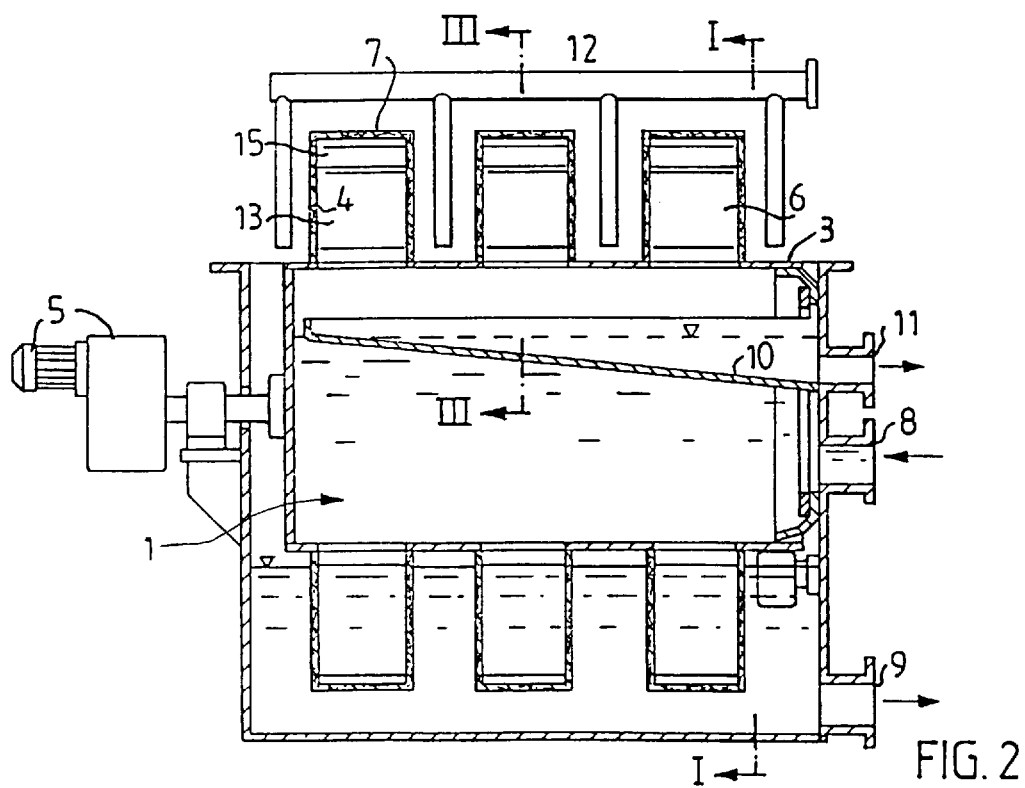
FIG. 2 shows a longitudinal section (II—II in FIG. 1)

FIGS. 1 and 2 show a principal embodiment of a disc filter. This comprises a filter rotor 1 placed in a filter vessel 2 for the filtrate. A hollow shaft 3, on which filter discs 4 with filtering means are arranged, is rotated in the vessel with the aid of a driving means 5. The filter means in their simplest embodiment are comprised of a filter cloth braced on a supporting underlayer so that an inside space 6 is formed. The filter cloth embraces both sides of the filter discs and preferably also the outer periphery 7. The inside of the filter discs communicate with the hollow shaft 3. The liquid mixture to be filtered is introduced in the hollow shaft through the inlet 8 and thereby also to the inner space 6 of the filter discs. A means according to known technique, not shown, sees to that a substantially constant level is maintained in the shaft and inside the filter discs. An advantageous arrangement for this purpose can be an automatic speed control so that, when the level tends to rise, the speed is increased and vice versa. The filtrate is removed though an outlet 9. The difference between the inlet and outlet levels is a measure of the effective hydrostatic pressure. The filtered-off coarse phase shall according to the invention be transferred to a collecting vessel 10 inside the hollow shaft. The bottom of this stationary collecting vessel is inclined towards an outlet 11 for the coarse phase. Such coarse phase, which during the rotation of the filtering means has not yet been released and fallen off from the filter cloth, when this approaches an upper position, is flushed away with the aid of spray nozzles 12 provided on the outer sides. Part of the spray water thereby passes through the filter cloth and cleans this, whereby the coarse phase falls down into the collecting vessel 10.

Figure 3:
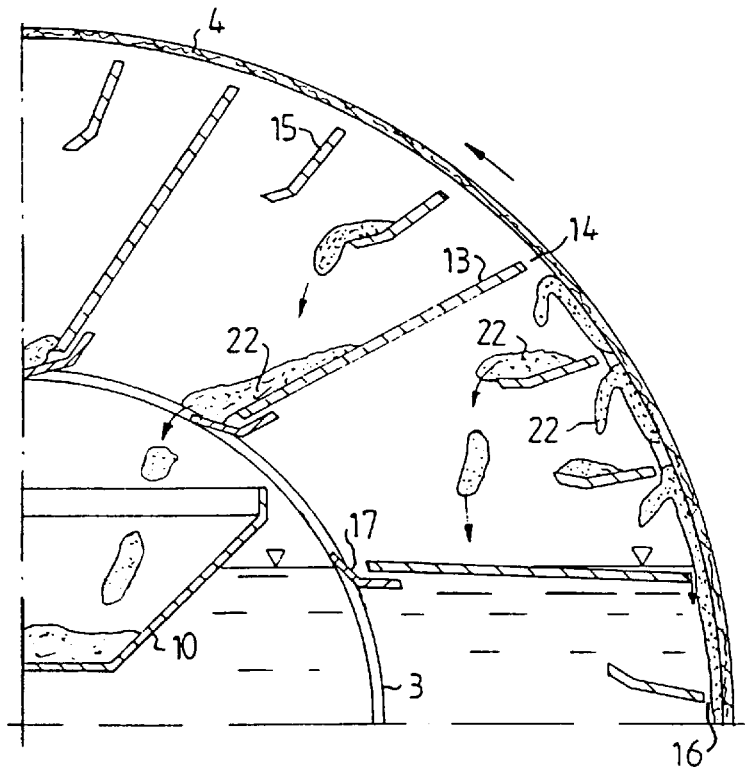
FIG. 3 shows the invention in a sector of a filter disc.

FIG. 3 shows a quarter sector in cross section of a filter disc 4 in an embodiment according to the invention. The space inside the filter discs has been provided with plates, herein called carrier elements 13, originating from the hollow shaft 3. They extend towards the periphery and are provided between the sides of the filter discs in an axial direction. The extension is such that a gap 14, an opening, is left against the periphery. The intention of this opening is that during the movement of the carrier elements in the liquid mixture, the liquid mixture shall be able to flow back opposite to the rotation. Another function made possible by these gaps is a quick removal of air from the cells formed by the carrier elements, when these again rotate down into the liquid pool as well as quick supply of air under the carrier elements, when these are moved up out of the pool surface. The carrier elements are oriented in such a way that they, during the passage of the liquid level, up out of the bath take a substantially horizontal position.

A weak inclination down towards the gap 14 facilitates a return flow of the liquid mixture to the pool at the passage of the liquid surface but this inclination must not be so big that any coarse phase having fallen down also slides down into the pool. The level of the liquid mixture should advantageously be kept higher than the center of rotation in order to be able to obtain an effective filtering surface being as large as possible. The carrier elements 13 will thus be so oriented, that the inner end thereof lying against the shaft during the rotation will lead over the outer end.

In a preferred embodiment according to the invention, between each pair of carrier elements 13 one or several shorter, outer carrier elements 15 are arranged close to the periphery. Thereby, the number of larger carrier elements 13 can be kept low. Further, these outer carrier elements 15 are suitably arranged in such a way that they take a substantially horizontal position, with a weak inclination outwardly at the passage up from the liquid pool. At the periphery there should be a gap 16 also for these outer carrier elements for the outflow of non-filtered liquid mixture and an air-outlet, respectively.

According to the present invention it shall not be possible for coarse phase 22, having let go of the filtering means, to be able to fall back into the liquid mixture. This risk prevails from the time the blade have come up out of the liquid pool until it becomes possible for the coarse phase to slide down into the collecting vessel 10. For this purpose blocking means are arranged, herein called barrier elements 17, so that the coarse phase shall not be able to slide off the blades at the rotation before they have reached the edge of the collecting vessel 10. These barrier elements can be arranged on the innermost part of the blades and extend forward in the direction of rotation, i.e. they can be comprised of an upward bend seen on the side where the filtering disc has un upward going direction of motion, in the rotational direction at or by the inner ends of the blades. The angle for the upward bend shall be so big that the upward bent part, the barrier element, at the rotation passes a horizontal position only after the passage of the edge of the collecting vessel, whereupon the coarse phase shall be able to slide down into the vessel. This upward bend of about the same size as described above should advantageously also be found on the outer carrier elements at the periphery.

Figure 4:
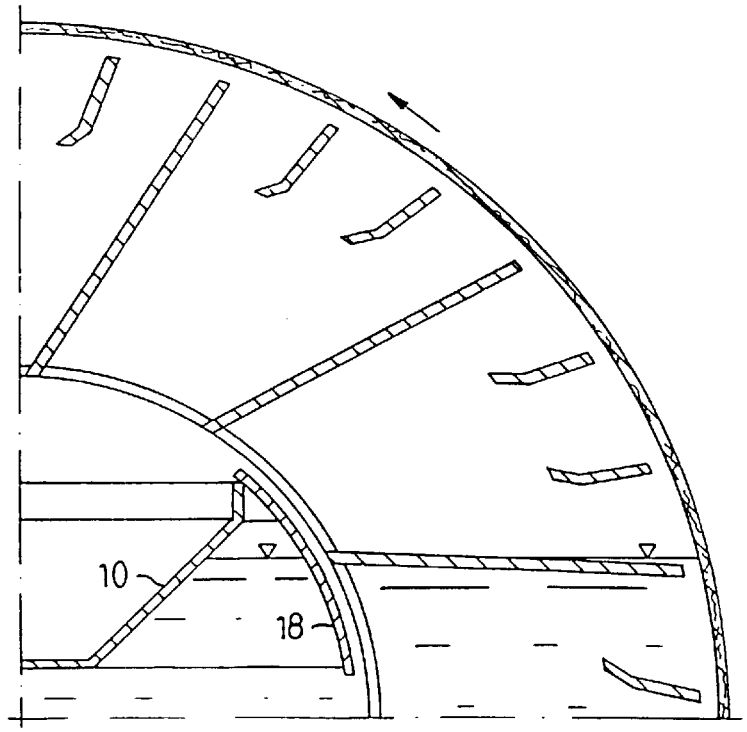
FIG. 4 shows an alternative embodiment of the invention.

As seen in FIG. 4, the barrier element for the coarse phase 22 alternatively can be a plate 18, advantageously fastened on the collecting vessel 10 or constitute one of the walls of the vessel. The plate extends in the direction of rotation in a circular arc from the pool surface for the liquid mixture up to the edge of the collecting vessel along all filtering discs. In contrast to the barrier elements of the above described carrier elements this plate is a stationary barrier element 18. This barrier element shall be placed such that the inner edge of the carrier elements sweep closely along the barrier element. As a further safety against any coarse phase coming down into the liquid mixture through the gap between the stationary barrier element 18 and the carrier elements, also according to this embodiment, the carrier elements can be designed with the above described barrier elements 17.

Figure 5:
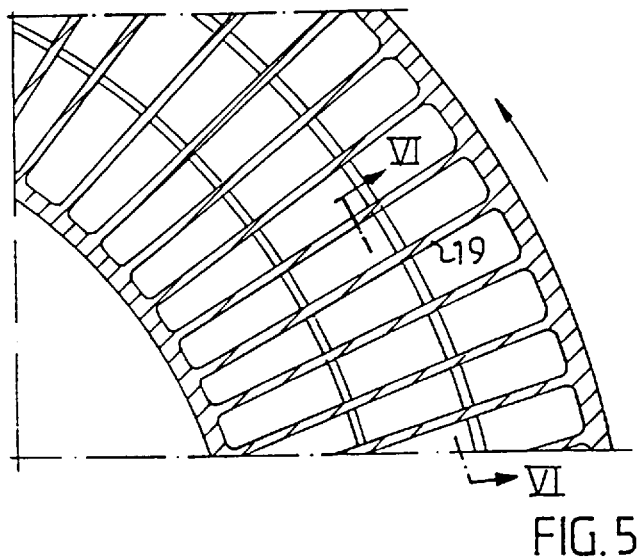
FIG. 5 shows, in a cross sectional view, a lateral surface of a filter disc (V—V in FIG. 6)
Figure 6:
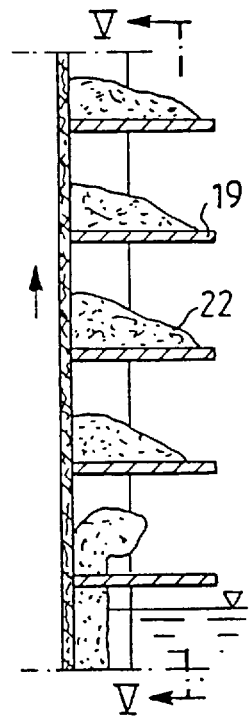
FIG. 6 shows, in an enlarged scale, a section (VI—VI in FIG. 5) of the lateral surface.

As is evident from FIGS. 5 and 6, in certain applications carrier elements 19 could be provided on the sides of the filtering discs, herein called side carrier elements. These are advantageously given a radial extension corresponding to the extension of the filtering means in the radial direction and can e.g. be flat bars or a grid. These side plates are so dimensioned that they at least transport coarse phase 22 having fallen down from the sides to such a level that the subsequent inner carrier elements (13 in FIG. 3) with their barrier elements at the rotation have time to reach above the pool surface of the liquid mixture. The barrier elements 17 thus provide that the coarse phase, which at the rotation after this position falls down onto the blades 13, is transported up to the collecting vessel 10. Advantageously, these side carrier elements 19 can be arranged to be supporting elements for the filtering means, usually the filter cloth.

Through the creation of the barrier elements, a larger flow of the liquid mixture through the gap 14 (FIG. 3) between the carrier element and the periphery is obtained compared with what should be the case without barrier elements. It has been shown that this causes certain disturbances at higher rotational speeds. Liquid mixture flowing back through the gap 14 has loosened the filter layer, the coarse phase, over a certain distance. This reduces then both the filter capacity regarding the amount of coarse phase as well as the purity of the filtrate.

Figure 7:
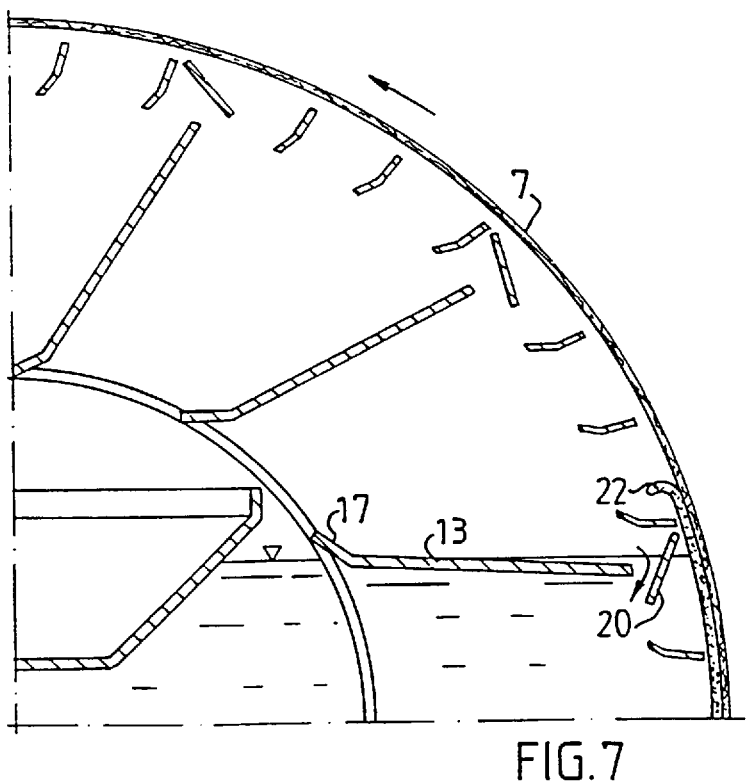
FIG. 7 shows an alternative embodiment of the invention.
Figure 8:
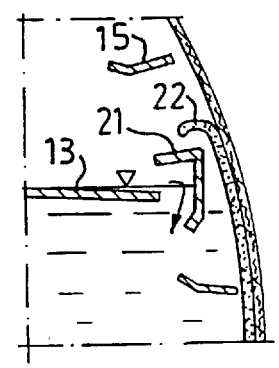
FIG. 8 shows a modification of the embodiment in FIG. 7.

This problem is solved as seen in FIGS. 7 and 8, with a shield member 20 radially outside the carrier element 13 towards the periphery. This shield is supposed to protect the coarse phase layer 22 outside the carrier element from the liquid stream by directing it from the periphery. The shield 20 can be given a straight form as is shown in FIG. 7 or it can be curved. An advantageous design is an angular plate 21 (FIG. 8), which gives better strength and prevents coarse phase from passing the gap. This design thus reduces the need or the number of outer carrier elements 15. It has been shown that the combination of barrier elements and shield members outside the inner carrier element 13 has made it possible to run the filters with a substantially higher rotational speed. This means that the filter units for a determined incoming flow of liquid mixture can be reduced substantially in size.

A number of modifications within the scope of the invention can be made. In certain applications, from an economical point of view, it can be advantageous to eliminate the filtering means extending around the periphery of the filter discs. In these cases neither the outer carrier elements 15, nor the shield members 20,21 are necessary.

I claim:

1. A rotating disc filter for separating a coarse phase from a liquid mixture, comprising:

a horizontal hollow shaft;

at least one vertical filter disc arranged on the hollow shaft and having a filtering means, the filter disc forming a space defined by the filtering means on the sides of the filter disc, said space communicating with the hollow shaft;

an inlet for supplying the liquid mixture to be separated into the hollow shaft and further into said space;

a collecting vessel in the hollow shaft for collecting a coarse phase developed in said space during operation of the disc filter;

carrier elements arranged on the filter disc in said space such that the carrier elements receive coarse phase dropping from the filtering means and carry said coarse phase to said collecting vessel during rotation of the filter disc, each carrier element being elongated and having an inner end and an outer end in relation to the filter disc; and barrier elements attached to the filter disc at the inner ends of the carrier elements, respectively, each barrier element having a straight part extending forward from its carrier element as seen in the direction of rotation, said straight part being positioned relative to the filter disc such that it extends horizontally when it passes a position above said collecting vessel during rotation of the filter disc, whereby each barrier element prevents coarse phase from dropping from its associated carrier element before the coarse phase is carried to said collecting vessel during rotation of the filter disc.

2. A rotating disc filter for separating a coarse phase from a liquid mixture, comprising:

a horizontal hollow shaft;

at least one vertical filter disc arranged on the hollow shaft and having a filtering means, the filter disc forming a space defined by the filtering means on the sides of the filter disc, said space communicating with the hollow shaft;

an inlet for supplying the liquid mixture to be separated into the hollow shaft and further into said space;

a collecting vessel in the hollow shaft for collecting a coarse phase developed in said space during operation of the disc filter;

carrier elements arranged on the filter disc in said space such that the carrier elements receive coarse phase dropping from the filtering means and carry said coarse phase to said collecting vessel during rotation of the filter disc; and a stationary barrier element provided on the collecting vessel and designed as a circular arc extending downwardly from the collecting vessel, whereby the stationary barrier element prevents coarse phase from dropping from the carrier elements before the coarse phase is carried to the collecting vessel during rotation of the filter disc.

3. A rotating disc filter for separating a coarse phase from a liquid mixture, comprising:

a horizontal hollow shaft;

at least one vertical filter disc arranged on the hollow shaft and having a filtering means, the filter disc forming a space defined by the filtering means on the sides of the filter disc, said space communicating with the hollow shaft;

an inlet for supplying the liquid mixture to be separated into the hollow shaft and further into said space;

a collecting vessel in the hollow shaft for collecting a coarse phase developed in said space during operation of the disc filter;

carrier elements arranged on the filter disc in said space such that the carrier elements receive coarse phase dropping from the filtering means and carry said coarse phase to said collecting vessel during rotation of the filter disc, wherein said space in the filter disc is defined by the filtering means also on an outer periphery of the filter disc, and radially outside said carrier elements shield members are provided for coarse phase deposited on the filtering means on said outer periphery, said shield members being arranged such that liquid flowing radially outwardly along the carrier elements is deflected away from said outer periphery by means of said shield members.

4. A rotating disc filter for separating a coarse phase from a liquid mixture, comprising:

a horizontal hollow shaft;

at least one vertical filter disc arranged on the hollow shaft and having a filtering means, the filter disc forming a space defined by the filtering means on the sides of the filter disc, said space communicating with the hollow shaft;

an inlet for supplying the liquid mixture to be separated into the hollow shaft and further into said space;

a collecting vessel in the hollow shaft for collecting a coarse phase developed in said space during operation of the disc filter;

carrier elements arranged on the filter disc in said space such that the carrier elements receive coarse phase dropping from the filtering means and carry said coarse phase to said collecting vessel during rotation of said filter disc, wherein said space in the filter disc is defined by the filtering means also on an outer periphery of the filter disc, and between adjacent carrier elements at least one outer carrier element is situated close to said outer periphery, said outer carrier element being arranged to receive coarse phase dropping from the filtering means on said periphery and to deliver received coarse phase to one of the carrier elements.

5. A disc filter according to claim 4, further comprising means for maintaining a substantially constant level of the liquid mixture in the hollow shaft and in said space, said outer carrier element extending substantially horizontally, when it moves upwardly past said level during rotation of the filter disc.

6. A rotating disc filter for separating a coarse phase from a liquid mixture, comprising:

a horizontal hollow shaft;

at least one vertical filter disc arranged on the hollow shaft and having a filtering means, the filter disc forming a space defined by the filtering means on the sides of the filter disc, said space communicating with the hollow shaft;

an inlet for supplying the liquid mixture to be separated into the hollow shaft and further into said space;

a collecting vessel in said hollow shaft for collecting a coarse phase developed in said space during operation of the disc filter;

carrier elements arranged on the filter disc in said space such that the carrier elements receive coarse phase dropping from the filtering means and carry said coarse phase to said collecting vessel during rotation of said filter disc;

a plurality of side carrier elements arranged at each side of the filter disc in said space to receive coarse phase dropping from the filtering means, each side carrier element extending axially from one side of the filter disc towards the other side of the filter disc but being spaced from said other side.

7. A disc filter according to claim 6, wherein the filtering means on the sides of the filter disc is supported by said side carrier elements.

* * * * *